(12) United States Patent
Jeong

(10) Patent No.: US 9,109,667 B2
(45) Date of Patent: Aug. 18, 2015

(54) CONTRA-ROTATING MECHANISM

(76) Inventor: Chang Log Jeong, Seoul (KR)

(*) Notice: Subject to any disclaimer, the term of this patent is extended or adjusted under 35 U.S.C. 154(b) by 755 days.

(21) Appl. No.: 13/061,108

(22) PCT Filed: Aug. 25, 2009

(86) PCT No.: PCT/KR2009/004723
§ 371 (c)(1),
(2), (4) Date: Feb. 25, 2011

(87) PCT Pub. No.: WO2010/024569
PCT Pub. Date: Mar. 4, 2010

(65) Prior Publication Data
US 2011/0172047 A1    Jul. 14, 2011

(30) Foreign Application Priority Data

Aug. 25, 2008 (KR) .................... 10-2008-0082683

(51) Int. Cl.
*F16H 3/60* (2006.01)
*F16H 3/56* (2006.01)
*F16H 1/36* (2006.01)
*F16H 1/22* (2006.01)

(52) U.S. Cl.
CPC .. *F16H 3/60* (2013.01); *F16H 1/22* (2013.01); *F16H 1/36* (2013.01); *F16H 3/56* (2013.01)

(58) Field of Classification Search
None
See application file for complete search history.

(56) References Cited

U.S. PATENT DOCUMENTS

| | | | | |
|---|---|---|---|---|
| 4,272,993 A | * | 6/1981 | Kopich | ............................ 475/90 |
| 4,726,257 A | * | 2/1988 | Nelson | ........................... 475/330 |
| 4,963,108 A | | 10/1990 | Koda et al. | |
| 7,291,088 B2 | * | 11/2007 | Arndt et al. | .................... 475/331 |

FOREIGN PATENT DOCUMENTS

| | | |
|---|---|---|
| JP | 61-006497 | 1/1986 |
| JP | 03-060498 | 6/1991 |
| JP | 09024896 | 1/1997 |
| KR | 1019940001340 | 1/1994 |
| KR | 10-0673560 | 1/2007 |
| KR | 10-2008-0106628 | 12/2008 |

OTHER PUBLICATIONS

International Search Report for PCT/KR2009/004723 Mailed on Mar. 12, 2010.

* cited by examiner

*Primary Examiner* — Erin D Bishop
(74) *Attorney, Agent, or Firm* — Revolution IP, PLLC

(57) ABSTRACT

A contra-rotating mechanism includes master and slave shafts coaxially arranged to rotate in first and second directions, the first direction being opposite to the second, a master driving member fixed around and to the master shaft to rotate therewith; a plurality of drive-transfer units symmetrically and radially arranged around the master driving member and receiving a driving force from the master to rotate in the second direction; a plurality of rotation reversing units symmetrically and radially arranged around the slave shaft, each rotation-reversing unit disposed between corresponding neighboring drive-transfer units of the drive-transfer units and configured to receive rotation-force from the corresponding drive-transfer units to rotate in the first direction, a slave driven member fixed around the slave shaft to rotate therewith in the second direction, the slave driven member to mesh with the plurality of rotation-reversing units to rotate in the second direction; and first and second panels.

4 Claims, 6 Drawing Sheets

CONTRA-ROTATING MECHANISM

RELATED APPLICATIONS

This application is a 371 application of International Application No. PCT/KR2009/004723, filed Aug. 25, 2009, which in turn claims priority from Korean Patent Application No. 10-2008-0082683, filed Aug. 25, 2008, each of which is incorporated herein by reference in its entirety.

TECHNICAL FIELD

The present invention relates to a contra-rotating mechanism and in particular to a contra-rotating mechanism in which coaxially arranged shafts can contra-rotate.

BACKGROUND ART

The contra-rotating mechanism means a mechanism in which when a master shaft rotates by a driving source, a slave shaft coaxial with a master shaft rotates in a reverse direction with respect to a master shaft. The CONTRA-rotating mechanism is widely used in the field such as a cooling fan, a blowing fan, a ship, an aircraft or others.

For example, a ship propelling apparatus called a CRP (Contra/Contra Rotating Propeller) is equipped with two propellers which are arranged coaxially and have opposed rotation directions. The ship propelling apparatus makes it possible to enhance energy efficiency while reducing noises with the aid of fluid dynamics of a front propeller and a rear propeller.

The conventional CRP ship propelling apparatus has one dual shaft formed of two shafts which are rotatably inserted. As two motors rotate in opposed directions, two propellers connected to the motors rotate in opposed directions. In the above conventional CRP ship propelling apparatus, since two motors are installed, the construction is complicated, and the area of installation disadvantageously increases, which leads to increasing costs.

The U.S. Pat. No. 5,890,938 discloses an apparatus for reversing the rotations of two shafts from each other by using one motor with the aid of bevel gears. The above apparatus has a complicated construction and is unstable.

The Korean patent number 10-0673560 filed by the same applicant as the present invention discloses an apparatus in which a plurality of intermediate gears are arranged at a front side and a rear side of a panel. In this case, since the number of intermediate gears is a lot, the construction of the apparatus is complicated, the whole volume of the apparatus increases. Since a lot of movements occur at the master shaft and the slave shaft, the mechanism becomes unstable.

DISCLOSURE OF INVENTION

Accordingly, it is a first object of the present invention to provide a contra-rotating mechanism which provides a structurally compact and stable construction by integrally arranging a minimized number of intermediate gears at the inner sides of a pair of panels, while overcoming the problems encountered in the conventional art. It is a second object of the present invention to provide a contra-rotating mechanism which is capable of prevent any movements of a master shaft or a slave shaft.

To achieve the above objects, there is provided a contra-rotating mechanism which comprises a master shaft and a slave shaft which are arranged on the same shaft and reversely rotate; a master driving member which rotates integrally with the master shaft; a plurality of drive-transfer units which are symmetrically arranged about the master driving member in a to radial shape and receive the rotations of the master driving member; a plurality of rotation-reversing units which are symmetrically arranged about the slave shaft between a plurality of the drive-transfer units in a radial shape and reversing at least one time the rotation of the drive-transfer unit; a slave driven member which is arranged at the center of a plurality of the rotation-reversing units and is receives the rotations of the reversing units and rotate integrally with the slave shaft; a first panel and a second panel which are arranged being opposed to each other at the outer sides of the master driving member, a plurality of the drive-transfer units, a plurality of the rotation-reversing units and the slave driven member, respectively, and rotatably supports the master shaft, a plurality of the drive-transfer units, a plurality of the rotation-reversing units and the slave shaft, respectively; and a movement prevention unit which prevents the movement of either the assembly of the slave shaft and the slave driven member or the assembly of the master shaft and the master driving member.

A plurality of the drive-transfer units each comprises an drive-transfer shaft which is rotatably supported by the first and second panels, respectively, at both end portions; a first drive-transfer member which is engaged to the drive-transfer shaft and receives the rotation of the master driving member; and a second drive-transfer member which is engaged to the drive-transfer shaft while being closer to the first drive-transfer member and rotates integrally with the first drive-transfer member; and a plurality of the rotation-reversing units each comprises a reversing shaft which is rotatably supported by the first and second panels, respectively, at both end portions; a first reversing member which is engaged to the reversing shaft at a portion corresponding to the second drive-transfer member for thereby reversing the rotation of the second drive-transfer member; and a second reversing member which is engaged to the reversing shaft while being closer to the first reversing member and rotates integrally with the first reversing member.

The movement prevention unit comprises a first flange which is arranged in at least one surface of both side surfaces of the slave driven member; and a first movement prevention groove which is formed either between the first reversing member and the second reversing member or the second reversing member and the second panel for an insertion of the first flange.

The movement prevention unit comprises a second flange which is arranged in at least one side surface of both side surfaces of the master driving member; and a second movement prevention groove which is formed either between the first drive-transfer member and the second drive-transfer member or the first drive-transfer member and the first panel for an insertion of the second flange.

The protruded heights of the first and second flanges are same as the depths of the first and second movement prevention grooves, respectively.

The movement prevention unit comprises either a pair of first flanges which are engaged to one side surface of the second drive-transfer member and the opposed side surface of the second reversing member for supporting both side surfaces of the slave driven member; or a pair of second flanges which are engaged to one side surface of the first drive-transfer member and the opposed side surface of the first reversing member for supporting both side surfaces of the master driving member.

The master shaft and the slave shaft are relatively rotatable-inserted, and the master shaft and the slave shaft are spaced apart from each other.

The rotation ratios of the master driving member, the first and second drive-transfer members, the first and second reversing members and the slave driven member are 1:1, respectively.

The drive-transfer unit and the rotation-reversing unit have the same construction and are arranged in opposed directions.

The master driving member, the first and second drive-transfer members, the first and second reversing members and the slave driven member are arranged on the same parallel rotary shafts, respectively.

A plurality of the drive-transfer units each comprises an drive-transfer shaft which is rotatably supported by the first and second panels at both side ends; a first drive-transfer member which is engaged to the drive-transfer shaft for receiving the rotations of the master driving member; a second drive-transfer member which is engaged to the drive-transfer shaft and rotates integrally with the first drive-transfer member; and a third drive-transfer member which is engaged to the drive-transfer shaft while being opposed to the second drive-transfer member with respect to the first drive-transfer member and rotates integrally with the first drive-transfer member; and a plurality of the rotation-reversing units each comprises a reversing shaft which is rotatably supported by the first and second panels at both side ends; a first reversing member which is engaged to the reversing shaft for thereby reversing the rotation of the second drive-transfer member; a second reversing member which is engaged to the reversing shaft and rotates integrally with the first reversing member; a third reversing member which is engaged to the reversing shaft for thereby reversing the rotation of the third drive-transfer member; and a fourth reversing member which is engaged to the reversing shaft and rotates integrally with the third reversing member; and the slave driven member comprises a first slave driven member which receives the rotation of the second reversing member; and a second slave driven member which receives the rotation of the fourth reversing member; and the slave shaft comprises a first slave shaft which is rotatably supported by the second panel and rotates integrally with the first slave driven member; and a second slave shaft which is rotatably supported by the first panel and rotates integrally with the second slave driven member.

There is further provided a movement prevention unit which prevents the movement of either the assembly of the master shaft and the master driving member and the assembly of the slave shaft and the slave driven member.

With the above construction, the contra-rotating mechanism according to the present invention makes it possible to implement a reverse rotation of a master shaft and a slave shaft by using one driving source in a simple combination with a master driving member, an drive-transfer unit, a reverse driving unit and a slave driven unit, without using an unstable bevel gear.

The first and second panels are arranged outside a master driving member, an drive-transfer unit, a reverse driving unit and a slave driven unit while surrounding the same, and each drive-transfer unit and a reverse driving unit are integral for thereby reducing the number of elements, and the lengths of rotation shafts can be made shorter, and a compact sized contra-rotating mechanism can be manufactured.

In addition, a plurality of drive-transfer units and a plurality of reverse units are arranged in a radial shape and symmetrically with respect to a master shaft, which leads to providing a dynamically stable contra-rotating mechanism.

The master driving member, the first and second electrically driving members, the first and second reverse members and the slave driven members are constructed in the same construction, and the drive-transfer unit and the reverse units are constructed in the same manner and are arranged being opposite to each other, by which it is possible to implement a modulated manufacture in the process.

With the aid of the movement prevention unit, it is possible to prevent any movements of either an assembly of the master shaft and the master driving member or an assembly of the slave shaft and the slave driven member.

The present invention can be applied to various technologies in such a manner that the master shaft and the slave shaft are engaged to each other or are arranged being spaced apart from each other.

The first and second slave shafts and the first and slave driven members are arranged at an input side and an output side, respectively, so the second slave shaft might be alternated with the master shaft for the use of an input shaft or might be used as a third output shaft.

BRIEF DESCRIPTION OF THE DRAWINGS

The present invention will become better understood with reference to the accompanying drawings which are given only by way of illustration and thus are not limitative of the present invention, wherein.

LIST OF REFERENCE NUMERALS OF DRAWINGS

Figure 1:
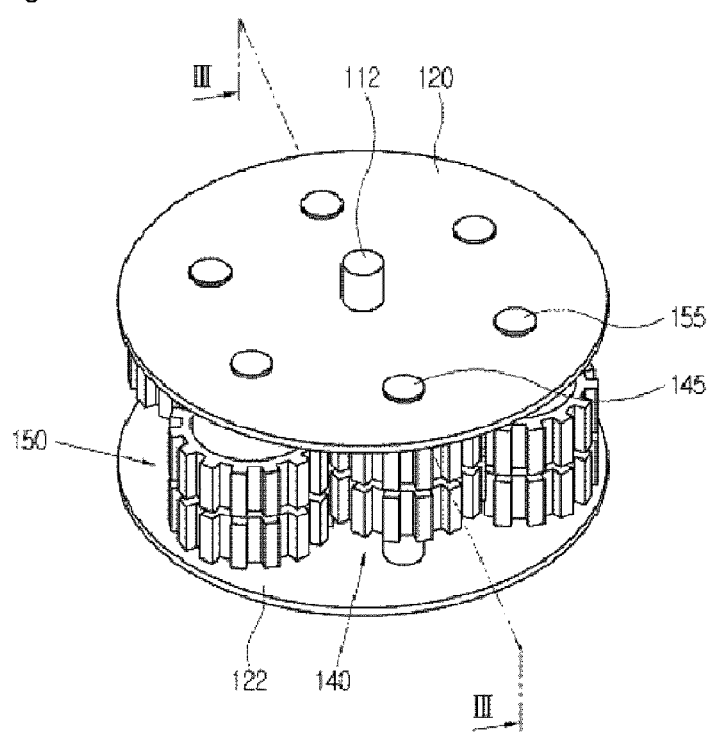
FIG. 1 is a perspective view illustrating a contra-rotating mechanism according to a first embodiment of the present invention.

112: master shaft 114: slave shaft
120: first panel 122: second panel
130: master driving member 140: drive-transfer unit
150: rotation-reversing unit 160: slave driven unit
170: movement prevention unit

MODES FOR CARRYING OUT THE INVENTION

The preferred embodiments of the present invention will be described with reference to the accompanying drawings. The same elements will be given the same reference numerals, and the descriptions on the same elements might be omitted for simplification.

Figure 2:
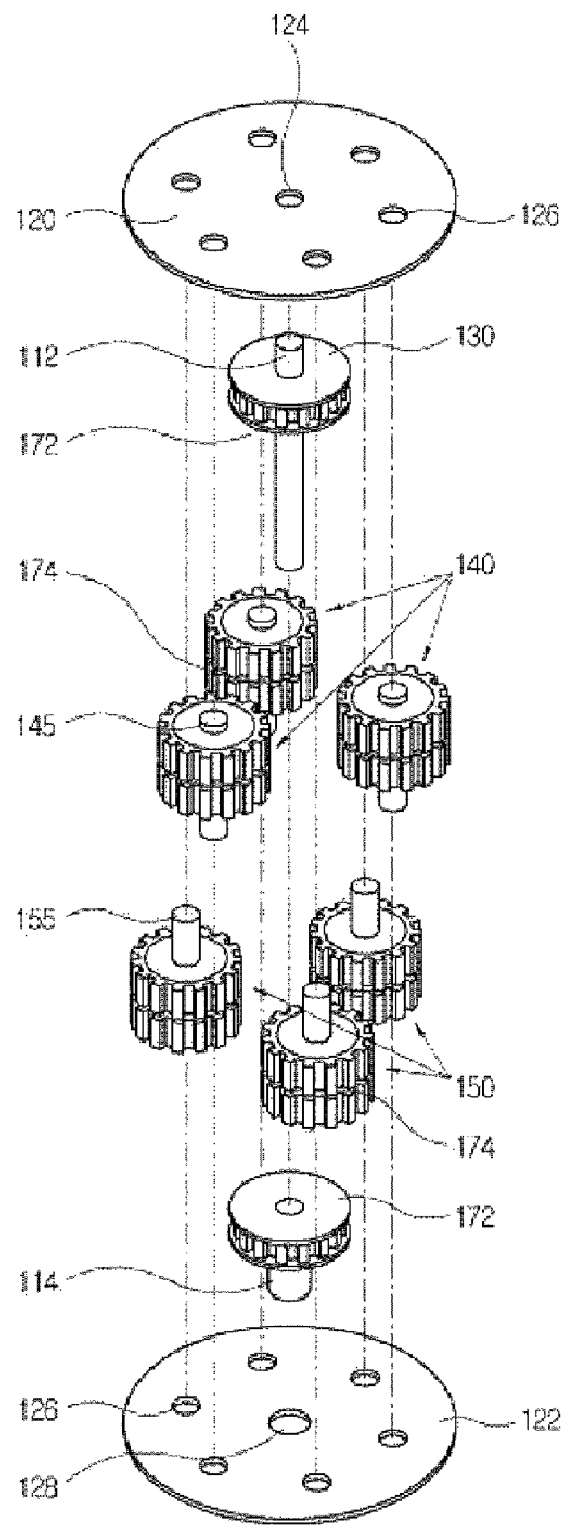
FIG. 2 is a disassembled perspective view illustrating a contra-rotating mechanism according to a first embodiment of the present invention.
Figure 3:
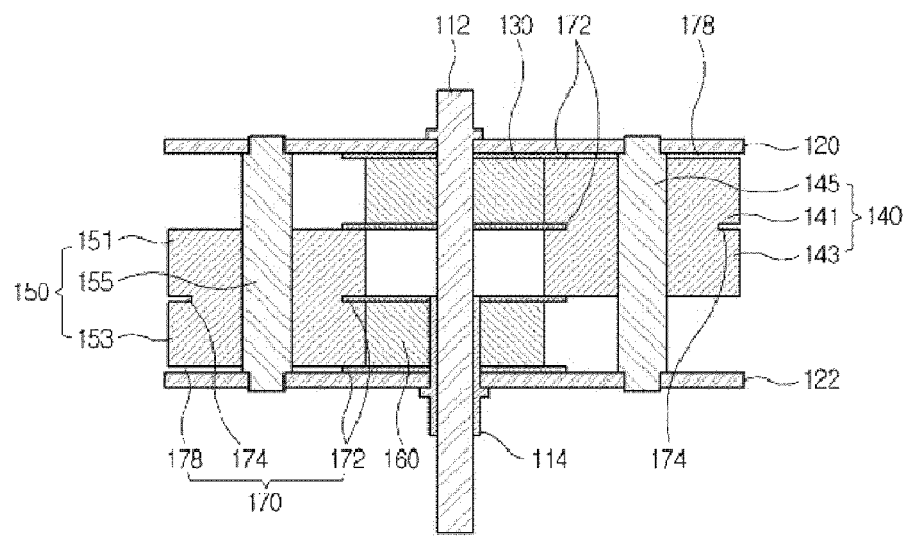
FIG. 3 is a cross sectional view taken along line III-III of FIG. 1.

FIGS. 1 to 3 are views illustrating a contra-rotating mechanism according to a first embodiment of the present invention. As shown therein, the contra-rotating mechanism according to the present invention comprises a master shaft 112, a slave shaft 114, a master driving member 130, an drive-transfer unit 140, a rotation-reversing unit 150, a slave driven member 160, and first and second panels 120 and 122. The contra-rotating mechanism according to the present invention might further comprise a movement prevention unit 170.

The master shaft 112 is rotatably supported at its both sides by means of the first and second panels 120 and 122. The input side terminal of the master shaft 112 might be connected with a driving source such as a motor or something, and an output side terminal might be connected with a load such as a propeller.

The slave shaft 114 is arranged at an output side of the contra-rotating mechanism and is rotatably supported by the second panel 122. The slave shaft 114 is made hollow and is rotatably inserted into the output side end portion of the master shaft 112 in a concentric shape.

The master driving member 130 is connected with the master shaft 112 and rotates integrally along with the master shaft 112. The master driving member 130 is manufactured separately from the master shaft 112 and is preferably engaged with the master shaft 112 in a known way such as a key striking way or a thermal striking way. It might be integral with the master shaft 112 if needed.

The drive-transfer unit 140 receives the rotation of the master driving member 130 and comprises a plurality of drive-transfer shafts 145, a plurality of first drive-transfer members 141 and a plurality of second drive-transfer members 143.

A plurality of the drive-transfer shafts 145 are symmetrically arranged about the master shaft 112 in a radial shape and are rotatably supported at both ends by means of the first and second panels 120 and 122. FIGS. 1 and 2 are views illustrating a state that three drive-transfer shafts 145 are symmetrically arranged about the master shaft 112 in a radial shape (refer to FIG. 4).

A plurality of the first drive-transfer members 141 are engaged to a plurality of the drive-transfer shafts 145 while being connected with the slave driven member 130 and rotate integrally along with the drive-transfer shaft 145, respectively. As a plurality of the drive-transfer shafts 145 are arranged in a radial shape about the master shaft 112, a plurality of the first drive-transfer members 141 are symmetrically arranged about the master shaft 112 or the master driving member 130 in a radial shape.

A plurality of the second drive-transfer members 143 are engaged with a plurality of the drive-transfer shafts 145, while being closer to a plurality of first drive-transfer members 141, and rotate integrally along with a plurality of the drive-transfer shafts 145. A plurality of the second drive-transfer members 143 are symmetrically arranged about the master shaft 112 like a plurality of the first drive-transfer members 141, in a radial shape.

The rotation-reversing unit 150 is directed to reversing the rotation of the drive-transfer unit 140 and comprises a plurality of reversing shafts 155, a plurality of first reversing members 151, and a plurality of second reversing members 153.

A plurality of the reversing shafts 155 are symmetrically arranged about the master shaft 112 between a plurality of the drive-transfer shafts 145 in a radial shape and are rotatably supported at both ends by means of the first and second panels 120 and 122.

A plurality of the first reversing members 151 are engaged with a plurality of the reversing shafts 155 for the connections with a plurality of the second drive-transfer members 143 and rotate integrally with the reversing shaft 155. As a plurality of reversing shafts 155 are symmetrically arranged in a radial shape about the master shaft 112, a plurality of the first reversing members 151 are symmetrically arranged about the master shaft 112 in a radial shape. A plurality of the first reversing members 151 are paired with a plurality of the second drive-transfer members 143, respectively, so when the second drive-transfer members 143 are three, the number of the first reversing members 151 is three (refer to FIG. 5).

A plurality of the second reversing members 153 are engaged with a plurality of the reversing shafts 155 while being closer to a plurality of the first reversing members 151 and rotate integrally with a plurality of the reversing shafts 155. A plurality of the second reversing members 153 are symmetrically arranged about the master shaft 112 in a radial shape like a plurality of the first reversing members 151.

Figure 6:
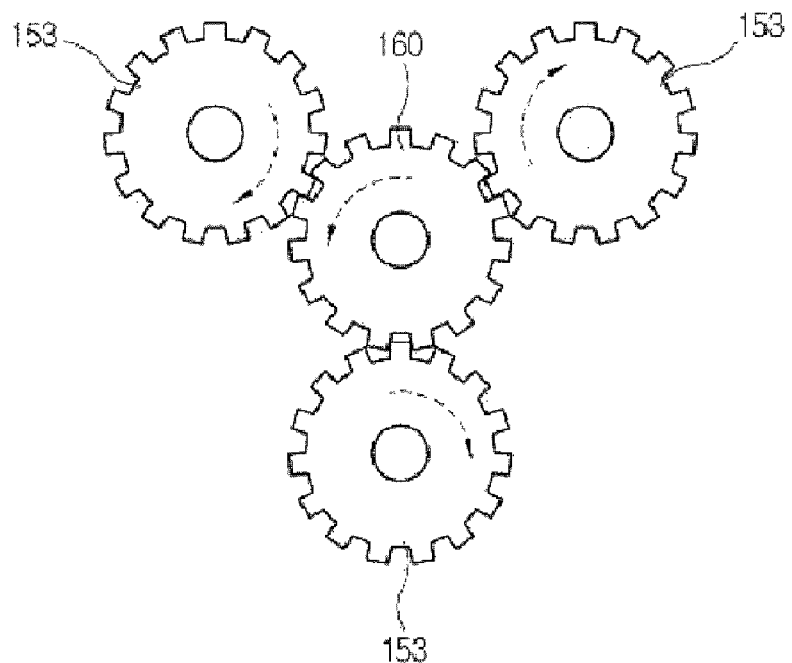
FIG. 6 is a view illustrating a connection of a reversing driving unit and a slave driven member in a contra-rotating mechanism according to a first embodiment of the present invention.

The slave driven member 160 is arranged at the center of a plurality of the second reversing members 153 for receiving the rotations of a plurality of the reversing members 153 (refer to FIG. 6).

The slave shaft 114 is arranged at the center of the slave driven member 160 and rotates integrally with the slave driven member 160, and the rotational force of the slave driven member 160 is transmitted to the output side of the contra-rotating mechanism according to the present invention. The slave shaft 114 is made hollow. The master shaft 112 is inserted into the inner side of the slave shaft 114 and rotates in the opposed direction in a concentric way.

The first and second panels 120 and 122 are arranged outside the master driving member 130, the drive-transfer unit 140, the rotation-reversing unit 150 and the slave driven member 160 and support the master shaft 112, the slave shaft 114, the drive-transfer shaft 145 and the reversing shaft 155, the construction of which is different from the Korean patent no. 10-0673560, so that the lengths of the shafts 112, 114, 145 and 155 are made shorter, and the construction of the contra-rotating mechanism becomes compact-sized.

A master shaft hole 124 is formed at the center of the first panel 120 for a rotational engagement with the master shaft 112, and a slave shaft hole 128 is formed at the center of the second panel 122 for a rotational engagement with the slave shaft 114. A plurality of shaft holes 126 are formed around the first and second panels 120 and 122, with a plurality of the drive-transfer shafts 145 and a plurality of the reversing shafts 155 being engaged to the shaft holes 126, respectively.

The first and second panels 120 and 122 are connected surrounding the master driving member 130, the drive-transfer unit 140, the rotation-reversing unit 150 and the slave driven member 160.

The movement prevention unit 170 is directed to preventing the movement of either the assembly of the master shaft 112 and the master driving member 130 or the assembly of the slave shaft 114 and the slave driven member 160. The movement prevention unit 170 comprises a flange 172 engaged to both sides of each the master driving member 130 and the slave driven member 160, and movement prevention grooves 174 and 178 formed between the first drive-transfer member 141 and the second drive-transfer member 143, the first drive-transfer member 141 and the first panel 120, the first reversing member 151 and the second reversing member 153, and the second reversing member 153 and the second panel 122, respectively, for an insertion of the flange 172.

With the above construction, the movement prevention unit 170 can help maintain a constant axial direction interval between the master driving member 130 and the slave driven member 160 while obtaining a constant space between the loads such as propellers engaged to the output side terminal of the master shaft 112 and the slave shaft 114.

The flange 172 and the movement prevention grooves 174 and 178 might be removed, both of which are provided for preventing a movement of either the assembly of the master shaft 112 and the master driving member 130 or the assembly of the slave shaft 114 and the slave driven member 160. Either a pair of the flanges 172 or the movement prevention grooves 174 and 178 might be omitted.

FIG. 3 is a view illustrating a construction the outer diameter of the flange 172, namely, the protruded height is larger than the outer diameters of the master driving member 130 and the slave driven member 160, which is one example of the construction. Namely, the outer diameter of the flange 172 is determined so that the flange 172 can be inserted into the movement prevention grooves 174 and 178 in a state that the master driving member 130 and the first drive-transfer member 141 are engaged with each other, and the slave driven member 160 and the second reversing member 153 are engaged with each other. For example, in case of gear engagements, it is preferred that the outer diameter of the flange 172 is actually same as or slightly smaller than the outer diameters of the master driving member 130 and the slave driven member 160.

The protruded height of the flange 172 is made same as the depths of the movement prevention grooves 174 and 178 for thereby preventing the movements in the radius directions of the assembly of the master shaft 112 and the master driving member 130 and the slave shaft 114 and the slave driven member 160.

In the contra-rotating mechanism according to the present invention, the master driving member 130, the first and second drive-transfer members 141 and 143, the first and second reversing members 151 and 153 and the slave driven member 160 might include various driving force transfer elements such as gears or friction rollers. In case of gears, flat gears, helical gears, etc. might be adapted.

The rotation ratios of the master driving member 130, the first and second drive-transfer members 141 and 143, the first and second reversing members 151 and 153 and the slave driven member 160 might be 1:1 or might be other ratio depending on the situation. In case that the rotation ratio is 1:1, it is possible to make the constructions of the master driving member 130, I the first and second drive-transfer members 141 and 143, the first and second reversing members 151 and 153 and the slave driven member 160 same for thereby easily obtaining a modulation process in the course of manufacture. The drive-transfer unit 140 and the rotation-reversing unit 150 can be made same and can be installed at opposed sides, which makes it possible to easily obtain modulations in the course of manufacture.

Since the master driving member 130, the first and second drive-transfer members 141 and 143, and the first and second reversing members 151 and 153 and the slave driven member 160 all rotate on the parallel rotation shafts 112, 114, 145 and 155, the assembling procedures can be made easier.

The operation of the contra-rotating mechanism according to the present invention will be described with reference to FIGS. 4 to 6 assuming that the driving force transmission elements are gears.

Figure 4:
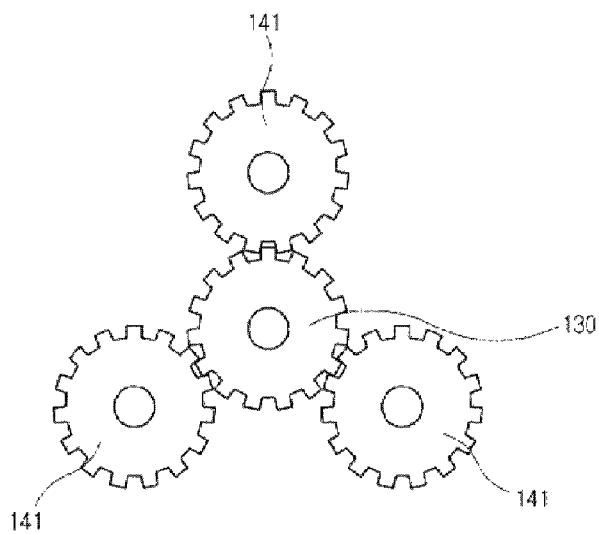
FIG. 4 is a view illustrating a connection of a master driving member and an drive-transfer unit in a contra-rotating mechanism according to a first embodiment of the present invention.

As shown in FIG. 4, when the master driving member 140 rotates clockwise integrally with the master shaft 112, a plurality of the first drive-transfer members 141 engaged with the master driving member 130 rotate counterclockwise integrally with a plurality of the drive-transfer shafts 145.

Figure 5:
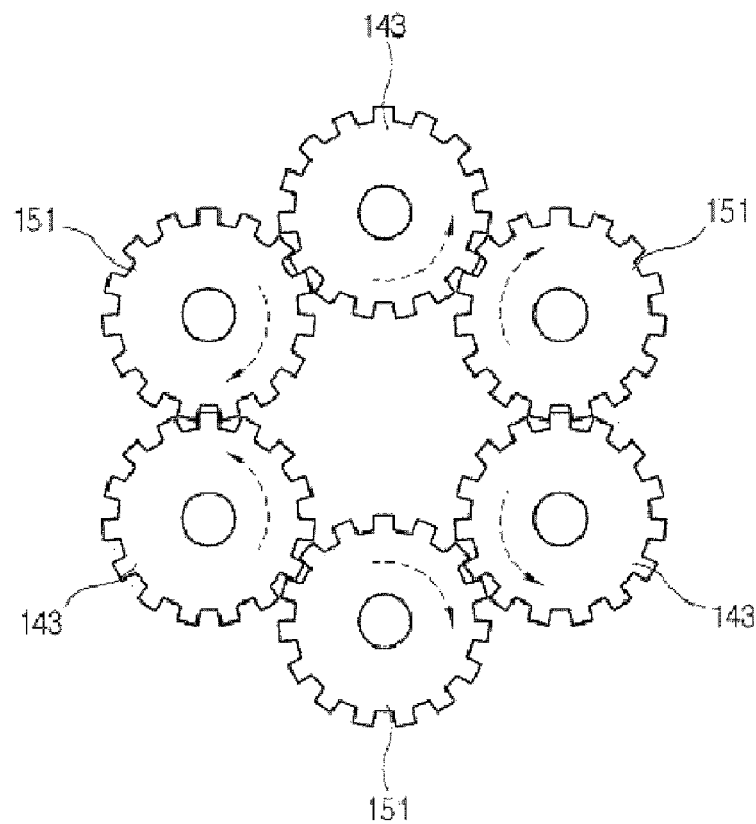
FIG. 5 is a view illustrating a connection of an drive-transfer unit and a reversing driving unit in a contra-rotating mechanism according to a first embodiment of the present invention.

As shown in FIG. 5, as the first drive-transfer member 141 rotates counterclockwise, the first drive-transfer member 141 and the second drive-transfer member 143 integrally rotating on the drive-transfer shaft 145 rotate counterclockwise, and the first reversing member 151 engaged with the second drive-transfer member 143 rotate clockwise. FIG. 5 is a view illustrating an operation that three drive-transfer members 143 rotate being engaged with three first reversing members 151.

As shown in FIG. 6, as the first reversing member 151 rotate clockwise, the first reversing member 151 and the second reversing member 153 integrally rotating on the reversing shaft 155 rotate clockwise, and the slave driven member 160 engaged with the second reversing member 153 rotates counterclockwise. So, the slave shaft 114 rotating integrally with the slave driven member 160 rotates counterclockwise. The master shaft 112 and the slave shaft 114 rotate in opposed directions while being inserted with each other.

As shown in FIGS. 4 to 6, since the engagement of the master driving member 130 and the first drive-transfer member 141, the engagement of the second drive-transfer member 143 and the first reversing member 151 and the engagement of the second reversing member 153 and the slave driven member 160 are all symmetrically arranged about the center in radial directions about the master shaft 112, which results in stable constructions in their dynamics.

Figure 7:
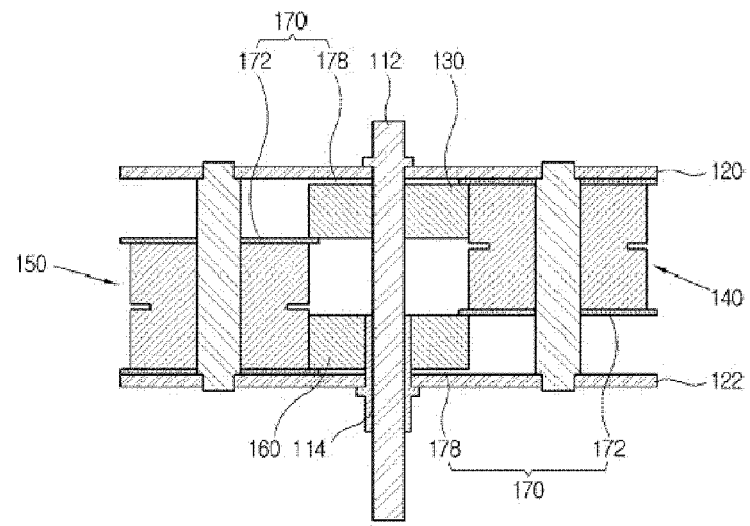
FIG. 7 is a cross sectional view illustrating a contra-rotating mechanism according to a second embodiment of the present invention.

FIG. 7 is a view illustrating the contra-rotating mechanism according to a second embodiment of the present invention. The contra-rotating mechanism according to the second embodiment of the present invention, as compared to the first embodiment of the present invention, is characterized in that the flange 172 forming the movement prevention unit 170 supports both sides of each master driving member 130 and the slave driven member 160, respectively. The flange 172 is formed either at one side surface of the first reversing member 151 and the opposed side surface of the second reversing member 153 or one side surface of the first drive-transfer member 141 and the opposed side surface of the second drive-transfer member 143. The flange 172 formed at one side surface of the first drive-transfer member 141 supports both sides of the master driving member 130 in cooperation with the flange 172 being closer to the first panel 120, while being inserted into the movement prevention groove 178 being closer to the first panel 120. In addition, the flange 172 disposed at one side surface of the second reversing member 153 supports both sides of the slave driven member 160 in cooperation with the flange 172 arranged at one side surface of the second drive-transfer member 143 while being inserted into the movement prevention groove 178 being closer to the second panel 122. In this case, the flange 172 might be arranged in at least one of a plurality of the first reversing members 151 which are arranged in a radial shape, at least one of a plurality of the second reversing members 153, at least one of a plurality of the first drive-transfer members 141 or at least one of the second drive-transfer members 143, respectively. In the second embodiment of the present invention, the movement prevention unit 170, which is directed to preventing the movement of either the assembly of the master shaft 112 and the slave driven member 130 or the assembly of the slave shaft 114 and the slave driven member 160, might be omitted.

Figure 8:
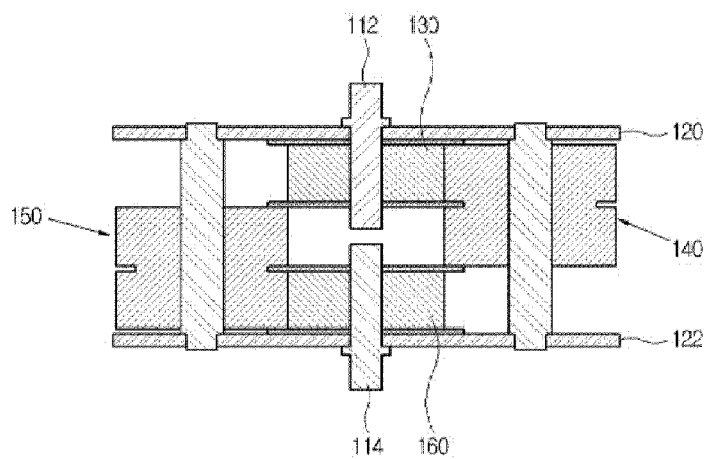
FIG. 8 is a cross sectional view illustrating a contra-rotating mechanism according to a third embodiment of the present invention.

FIG. 8 is a view illustrating a contra-rotating mechanism according to a third embodiment of the present invention. The contra-rotating mechanism according to the third embodiment of the present invention, as compared to the first embodiment, is characterized in that the master shaft 112 and the slave shaft 114 are spaced apart from each other on the concentric shaft. The master shaft 112 and the slave shaft 114, which rotate in reverse directions from each other, are separately disposed at the first panel 120 and the second panel 122, respectively, it can be well applied to an exercise mechanism which uses pedals.

Figure 9:
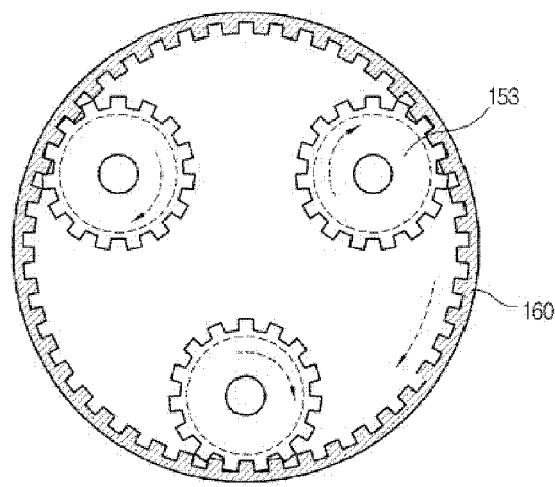
FIG. 9 is a schematic view illustrating a contra-rotating mechanism according to a fourth embodiment of the present invention.

FIG. 9 is a view illustrating a contra-rotating mechanism according to a fourth embodiment of the present invention. The contra-rotating mechanism according to the fourth embodiment of the present invention is characterized in that the slave driven member 160 is formed of an inner tooth part. Namely, the second reversing member 153 and the slave driven member 160 are connected while being inner-contacted with each other. In this case, it is preferred that the master driving member 130 is formed of an inner tooth part and inner-contacts with the first drive-transfer member 141. Either the master driving member 130 or the slave driven member 160 might be formed of an inner tooth part.

Figure 10:
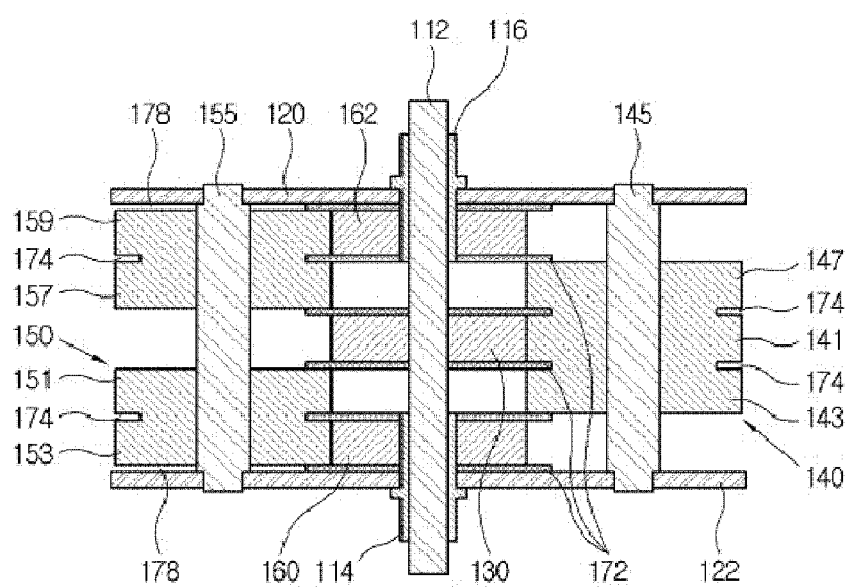
FIG. 10 is a cross sectional view illustrating a contra-rotating mechanism according to a fifth embodiment of the present invention.

FIG. 10 is a view illustrating a contra-rotating mechanism according to a fifth embodiment of the present invention, which is characterized in that as compared to the first embodiment of the present invention, the first and second slave shafts 114 and 116 and the second slave driven members 160 and 162 are symmetrically arranged at the input side and the output side, respectively. For the above construction, the drive-transfer unit 140 further comprises a plurality of drive-transfer shafts 145, a plurality of first drive-transfer members 141 and a plurality of second drive-transfer members 143. The third drive-transfer member 147 is arranged being opposed to the second drive-transfer member 143 with respect to the first drive-transfer member 141. The rotation-reversing unit 150 comprises a plurality of reversing shafts 155, a plurality of first reversing members 151 and a plurality of second reversing members 159 and further comprises a plurality of third reversing members 157 and a plurality of fourth reversing members 159. The constructions and operations of the second slave shaft 116, the second slave driven member 162, the third slave driven member 147 and the third and fourth reversing members 157 and 159 are same as those of the first slave shaft 114, the first slave driven member 160, the second slave member 143 and the first and second reversing members 151 and 153, so the duplicating descriptions will be omitted. The movement prevention unit 170, as compared to the first embodiment of the present invention, is same as the first embodiment except that the numbers of the flange 172 and the movement prevention groove 174 are increased, so the duplicating descriptions will be omitted. With the above constructions, when either the input side terminal of the master shaft 112 or the second slave shaft 116 rotates, the rotation opposed to the other side occurs, and at the same time the opposed rotations occur at the output side terminal of the master shaft 112 and the first slave shaft 114, respectively. So, the input side terminal of the master shaft 112 and the second slave shaft 116 might be alternately used as an input shaft. According to the situations, either the input side terminal of the master shaft 112 or the second shaft 116 might be used as an input shaft, and the remaining one might be used as a third output shaft.

The preferred embodiments of the present invention have been described above with reference to the accompanying drawings, but the disclosed descriptions are not limited thereto. Various modifications might be possible within the scopes of the basic concepts of the present invention.

For example, in the above embodiments of the present invention, a dual shaft structure consisting of the master shaft 112 and the slave shaft 114, 116 based on one conversion has been described, but the structure with triple shafts or more might be implemented by increasing the number of conversions to multiple numbers.

The constructions that the master shaft 130 is formed in a solid form and the slave shaft 114, 116 is formed in a hollow form are just one example; namely, opposed constructions can be applied for the same purpose.

The invention claimed is:

1. A contra-rotating mechanism, comprising:
master and slave shafts coaxially arranged to rotate in first and second directions respectively, the first direction being opposite to the second direction;
a master driving member fixed around and to the master shaft to rotate therewith in the first direction;
at least three or more drive-transfer units symmetrically and radially arranged around the master driving member and configured to receive a driving force from the master driving member to rotate in the second direction;
at least three or more reversing units symmetrically and radially arranged around the slave shaft, each reversing unit being disposed between corresponding neighboring drive-transfer units of the drive-transfer units and being configured to receive rotation-force from the corresponding drive-transfer units to rotate in the first direction;
a slave driven member fixed around and to the slave shaft to rotate therewith in the second direction, the slave driven member meshing with each of the at least three or more reversing units to rotate in the second direction;
first and second panels facing away from each other and being configured to sandwich therebetween the master driving member, the drive-transfer units, the reversing units and the slave driven member; and
a movement prevention unit comprising a plurality of flanges and movement prevention grooves,
wherein the first and second panels support the drive-transfer units and the reversing units so that the drive-transfer units and the reversing units rotate,
wherein each drive-transfer unit comprises,
a drive-transfer shaft, each drive-transfer shaft having two ends respectively being rotatably supported by the first and second panels at the same time,
a first drive-transfer member fixed to and around the respective drive-transfer shaft meshing with the master driving member, and
a second drive-transfer member fixed to and around the respective drive-transfer shaft and rotating together with the first drive-transfer member,
wherein each reversing unit comprises,
a reversing shaft, each reversing shaft having two ends respectively being rotatably supported by the first and second panels at the same time,
a first reversing member fixed to and around the respective reversing shaft and meshing with the respective adjacent second drive-transfer member of one of the three or more drive-transfer units one of the three or more drive-transfer units, and
a second reversing member fixed to and around the respective reversing shaft and rotating together with the first reversing member,
wherein the drive-transfer shafts and the reversing shafts are rotatably supported by the first and second panels at the same time are rotatably supported by the first and second panels at the same time, wherein any one of the three or more drive-transfer units meshes with the respective adjacent two reversing units reversing units, wherein any one of the three or more reversing units meshes with the respective adjacent two drive-transfer units transfer units, wherein the flanges comprise a first flange, and the first flange engages with one of two sides of the master driving member, and the movement prevention grooves comprise at least one groove between the first and second drive-transfer members, and at least one groove between the first drive-transfer member and the first panel for insertion of the first flange between the first drive-transfer member and the first panel of the flange, wherein the flanges further comprise a second flange, and the second flange engages with one of two sides of the slave driven member, and the movement prevention grooves further comprise at least one groove between the first and second reversing members, and at least one groove between the second reversing member and the second panel for insertion of the second flange between the second reversing member and the second panel flange.

2. The mechanism according to claim 1, wherein the slave shaft has a hollow structure so that the master shaft is inserted into the slave shaft.

3. The mechanism according to claim 1, wherein said master shaft and said slave shaft are spaced apart from each other.

4. The mechanism according to claim 1, wherein a rotation ratio between the master driving member, the first and second drive-transfer members, the first and second reversing members and the slave driven member is 1:1.

* * * * *